US010192432B2

(12) United States Patent
Lorkowski et al.

(10) Patent No.: US 10,192,432 B2
(45) Date of Patent: Jan. 29, 2019

(54) METHODS AND SYSTEMS FOR DETECTING A PARTIAL CLOSURE OF A NAVIGABLE ELEMENT

(71) Applicant: TomTom Traffic B.V., Amsterdam (NL)

(72) Inventors: Stefan Lorkowski, Berlin (DE); Arne Kesting, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 0 days.

(21) Appl. No.: 15/310,454

(22) PCT Filed: May 12, 2015

(86) PCT No.: PCT/EP2015/060494
§ 371 (c)(1),
(2) Date: Nov. 11, 2016

(87) PCT Pub. No.: WO2015/173252
PCT Pub. Date: Nov. 19, 2015

(65) Prior Publication Data

US 2017/0061787 A1 Mar. 2, 2017

(30) Foreign Application Priority Data

May 13, 2014 (GB) .................................. 1408474.3

(51) Int. Cl.
*G08G 1/01* (2006.01)
*G01C 21/32* (2006.01)

(52) U.S. Cl.
CPC ........... *G08G 1/0133* (2013.01); *G01C 21/32* (2013.01); *G08G 1/0112* (2013.01); *G08G 1/0129* (2013.01); *G08G 1/0141* (2013.01)

(58) Field of Classification Search
CPC .. G08G 1/0133; G08G 1/0112; G08G 1/0129; G08G 1/0141; G01C 21/32
(Continued)

(56) References Cited

U.S. PATENT DOCUMENTS

2006/0173618 A1* 8/2006 Eyer .................. G01C 21/3484 701/469
2007/0244627 A1* 10/2007 Boss .................... G08G 1/0104 701/117
(Continued)

FOREIGN PATENT DOCUMENTS

CN 103226892 A 7/2013
JP 2009169674 A 7/2009
(Continued)

OTHER PUBLICATIONS

International Search Report dated Jul. 13, 2015 for International Application No. PCT/EP2015/060494.
(Continued)

*Primary Examiner* — Marthe Y Marc-Coleman

(57) ABSTRACT

A method of identifying navigable stretches that are partially closed, e.g. due to the presence of roadworks, in a navigable network within a geographic area. A server obtains positional data relating to the movement of a plurality of devices along a navigable stretch with respect to time in a given time period, wherein the time period is a period of non-congested traffic flow. The positional data is used to determine an average speed of travel along the navigable stretch in the given time period. The determined average speed of travel is compared to a free flow speed for the stretch, and the navigable stretch is identified as being partially closed when the determined average speed of travel is lower than the free flow speed by a predetermined value.

20 Claims, 2 Drawing Sheets

(58) Field of Classification Search
USPC ....... 701/533, 117, 408, 461, 409, 532, 422; 340/934
See application file for complete search history.

(56) References Cited

U.S. PATENT DOCUMENTS

| | | | | |
|---|---|---|---|---|
| 2010/0207787 | A1* | 8/2010 | Catten | G06F 17/30241 340/905 |
| 2010/0299064 | A1* | 11/2010 | Hilbrandie | G01C 21/32 701/533 |
| 2011/0161261 | A1* | 6/2011 | Wu | G08G 1/0104 706/12 |
| 2012/0330547 | A1* | 12/2012 | Witte | G01C 21/3446 701/533 |
| 2013/0317744 | A1* | 11/2013 | Mieth | G01C 21/32 701/533 |

FOREIGN PATENT DOCUMENTS

| | | | |
|---|---|---|---|
| JP | 2012137833 | A | 7/2012 |
| WO | 2004021306 | A2 | 3/2004 |
| WO | 2008152279 | A2 | 12/2008 |
| WO | 2012089282 | A1 | 7/2012 |
| WO | 2012104392 | A1 | 8/2012 |
| WO | 2014001561 | A2 | 1/2014 |

OTHER PUBLICATIONS

Search Report dated Nov. 13, 2014 for GB Application No. 1408474.3.

* cited by examiner

METHODS AND SYSTEMS FOR DETECTING A PARTIAL CLOSURE OF A NAVIGABLE ELEMENT

CROSS-REFERENCE TO RELATED APPLICATIONS

The present application is a National Stage of International Application No. PCT/EP2015/060494, filed on May 12, 2015, and designating the United States, which claims benefit to United Kingdom Patent Application No. 1408474.3 filed on May 13, 2014. The entire content of these applications is incorporated herein by reference.

FIELD OF THE INVENTION

The present invention relates to methods and systems for detecting the partial closure of a navigable element, e.g. road element, in a navigable network of navigable elements.

BACKGROUND TO THE INVENTION

Obtaining information about partial closures of navigable elements, e.g. roads of a road network, is important in a navigation system. Partial closures occur, for example, when one or more (although not all) lanes of a road, and thus cause a reduction in the normal traffic capacity of the element; although traffic flow along the element is still possible. One common cause of partial road closures are roadworks, in which a portion of a road is occupied by people and/or equipment, for example, to repair the road surface, or to remove debris from the road in the event of a traffic accident.

The presence of a partial road closure has a significant impact upon routing through the road network. Knowledge of the existence of a partial road closure is of importance to road users even if they are not following a pre-calculated route. For example, if a user is following a familiar route, it is still useful for them to be aware if a partial road closure is present affecting the route so that they may determine an alternative route, with or without the assistance of a navigation system.

Road closure information may be provided to a user, e.g. together with other travel and traffic information, during navigation along a route via an in-vehicle navigation device, such as a portable device (PND) or integrated device, or may be provided as an input to an Advanced Driver Assistance System (ADAS) device. Road closure information may also be used for route planning, e.g. by a navigation or ADAS device, before commencing a journey, or to recalculate a fastest route during a journey if conditions change during traversal along the route.

A road closure is typically a dynamic event, temporarily affecting a road, and it is therefore desirable to be able to obtain information relating to road closures in the context of a "live" system, i.e. indicative of the relatively current condition of the road network.

Conventional systems for obtaining information about road closures typically rely upon data obtained from third parties. For example, such data may be included in "Traffic Message Channel" (TMC) messages that may be broadcast over an FM network, or other similar third party messages. Such information may be based upon data obtained from sources such as police reports, or road agencies/administrators. However, there are some drawbacks in relying upon third party data relating to road closures, since such data is not always accurate, and may not be up to date.

The Applicant has realised that there remains scope for improvement in methods and systems for obtaining information relating to the partial closure of a navigable element, e.g. for provision to users and/or navigation or ADAS devices.

SUMMARY OF THE INVENTION

In accordance with a first aspect of the invention there is provided a method of identifying navigable stretches that are partially closed in a navigable network within a geographic area, the method comprising:

obtaining positional data relating to the movement of a plurality of devices along a navigable stretch with respect to time in a given time period, wherein the time period is a period of non-congested traffic flow;

using the positional data to determine an average speed of travel along the navigable stretch in the given time period;

comparing the determined average speed of travel to a free flow speed for the navigable stretch; and determining that the navigable stretch is partially closed when the determined average speed of travel is lower than the free flow speed by a predetermined value.

Thus, in accordance with the invention, navigable stretches that are potentially closed, e.g. due to being affected by roadworks, are detected by comparing an average speed of travel along the stretch, determined based on positional data (also referred to herein as "probe data") and under low, i.e. non-congested, traffic conditions, to a free flow speed of travel along the element. It would be expected that under low traffic conditions, vehicles should travel along the stretch at close to the free flow speed. Where the actual average speed of vehicles is appreciably less than the free flow speed, during a time period in which free flow conditions are expected, it can be assumed that a factor other than transient traffic jams are causing a reduction of traffic flow, e.g. roadworks. The invention therefore preferably includes identifying navigable stretches that are potentially affected by roadworks.

The present invention extends to a system for carrying out a method in accordance with any of the embodiments of the invention described herein.

In accordance with a second aspect of the invention there is provided a system for identifying navigable stretches that are partially closed in a navigable network within a geographic area, the system comprising:

means for obtaining positional data relating to the movement of a plurality of devices along a navigable stretch with respect to time in a given time period, wherein the time period is a period of non-congested traffic flow;

means for using the positional data to determine an average speed of travel along the navigable stretch in the given time period;

means for comparing the determined average speed of travel to a free flow speed for the navigable stretch; and means for determining that the navigable stretch is partially closed when the determined average speed of travel is lower than the free flow speed by a predetermined value.

It will be appreciated that any feature described by reference to the first aspect of the invention may equally be applied to embodiments in accordance with the second aspect of the invention and vice versa.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a determined potential closure, and/or the positional data used to determine the existence of a closure.

The methods of the present invention are, in preferred embodiments, implemented by a server. Thus, in embodiments, the system of the present invention comprises a server comprising the means for carrying out the various steps described, and the method steps described herein are carried out by a server.

The present invention considers positional data relating to the movement of a plurality of devices with respect to time along a navigable stretch of a navigable network to determine whether the stretch may be partially closed. It will be appreciated that the navigable network as referred to herein is a real world or physical navigable network, e.g. a road network. The invention is applicable, however, to any navigable network, e.g. networks of paths, rivers, canals, cycle paths, tow paths, railway lines, or the like.

The network may be represented electronically by digital map data. The digital map data may be stored by or otherwise accessible by the server, in embodiments in which the method is implemented using a server. In the digital map data, the navigable network is represented by a plurality of navigable segments connected by nodes, wherein a navigable element of the network may be represented by one or more navigable segments. The term "navigable stretch" as used herein refers to at least a portion of one or more navigable segments. The stretch may be made up of a part of any segment or segments, and/or may include one or more entire segments. Embodiments of the present invention are described with reference to road segments and stretches, and preferably the navigable stretches represent highways with free flow speeds of more than 100 km/h. It should be realised that the invention may also be applicable to other navigable stretches made up of other types of segments. For ease of reference these are commonly referred to as a road segment or stretches.

The positional data used in accordance with the invention is positional data relating to the movement of a plurality of devices along the or each navigable stretch with respect to time. The method may comprise obtaining positional data relating to the movement of a plurality of devices with respect to time in the navigable network, and filtering the positional data to obtain positional data relating to the movement of a plurality of devices along the or each given navigable stretch to be assessed for potential closure with respect to time. The step of obtaining the positional data relating to the movement of devices along the or each navigable stretch may be carried out by reference to the digital map data indicative of the navigable network. The method may involve the step of matching positional data relating to the movement of devices in a geographic region including the navigable network to at least the or each navigable stretch that is being considered in accordance with the invention.

In embodiments, the method comprises obtaining positional data relating to the movement of a plurality of devices along one or more navigable segments of the digital map representative of the navigable network with respect to time in a given time period.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The present invention may provide "live", i.e. short term, detection of partial closures, e.g. the presence of roadworks, based on current or near current data. For live positional data, it will be appreciated that the data may be stored shortly before being used, so that it may still be considered to be live data.

The method of the present invention preferably involves obtaining and using "live" positional data relating to the movement of a plurality of devices with respect to time along the or each navigable stretch that is assessed for potential partial closure. Live data may be thought of as data which is relatively current and provides an indication of relatively current conditions on each navigable stretch. The live data may typically relate to the conditions on the elements within the last few hours (since roadworks can last for many hours), or can relates to conditions within shorter time periods, e.g. for 30 minutes, 15 minutes, 10 minutes or 5 minutes. By using live positional data in determining the closure information, it may be assumed that the information determined is currently applicable, and may be applicable in the future, at least in the shorter term. The use of live positional data allows accurate and up to date closure information to be determined, that can be relied upon by road users and/or navigation devices or ADAS.

The positional data is used to determine an average speed of travel along the navigable stretch in a given time period. In embodiments, in which the obtained positional data relates to the movement of a plurality of devices along one or more navigable segments of the digital map, the positional data is used to determine an average speed of travel along at least a portion of the one or more navigable segments in the given time period. The given time period is a time period in the recent past, and preferably includes a current time. This is because the method seeks to determine an average speed of travel that is applicable under current conditions, so that if the average speed of travel is found to be indicative of a partial closure, e.g. due to the presence of roadworks, it may be assumed that the finding is still applicable. In some preferred embodiments the positional data is live positional data. The average speed of travel in the given time period that is determined is based on the speeds of a plurality of devices that traversed the stretch in the given time period according to the positional data.

The average speed of travel determined is in respect of a given time period during which the traffic volume for the stretch is such as to allow non-congested flow. In other words, the given period is therefore a period in which free flow conditions would be expected, i.e. during periods of low traffic volume.

In embodiments, a time at which there is a traffic volume that allows non-congested flow can be defined as when the traffic volume is substantially lower than the average traffic volume for the stretch (or corresponding segment or segments). The traffic volume for a stretch or segment is indicative of the number of vehicles that traverse the stretch or segment within a given period of time. The current traffic volume and the average traffic volume may be determined in any suitable manner, and may involve the use of vehicle positional, i.e. probe, data, and/or other sources of data that may provide a vehicle count e.g. third party data, data from fixed sensors, etc.

Accordingly, preferably the given time period for which the average speed of travel along the stretch or segment is determined is a time period in which the traffic volume along the stretch or segment does not exceed a given threshold set by reference to the average traffic volume for the stretch or segment. Preferably the given time period for which the average speed of travel along the stretch or segment is determined is a time period in which the traffic volume along the stretch or segment does not exceed 50% of the average traffic volume for the stretch or segment.

The method involves the step of comparing the determined average speed of travel along the navigable stretch (or at least portion of one or more navigable segments) to a free flow speed for the stretch or respective one or more segments. The free flow time speed of a navigable stretch or segment is indicative of the average speed of vehicles traversing the stretch or segment during a period of time in which there is no or substantially little traffic. This period may for example be one or more night-time hours where the attainable speed may be less influenced by other users. Such free-flow speeds will still reflect the influence of speed limits, road layout and traffic management infrastructure for example. In embodiments data indicative of the free flow speed is associated, in the digital map data, with data indicative of the navigable segment to which it relates. In this way, the average speed of travel along the stretch or segment according to the positional data under non-congested conditions is compared to the free flow speed for the stretch or segment. Under these conditions, it may be assumed with greater certainty that an appreciable reduction in the average speed of travel is indicative of the presence of roadworks affecting traffic flow along the stretch or segment.

The step of comparing the average speed of travel to the free flow speed comprises comparing the average speed of travel to a threshold set by reference to the free flow speed. In other words, the threshold is a threshold relative to the free flow speed. The method may comprise determining that the navigable stretch or segment is potentially affected by roadworks when the average speed in the given time period does not exceed the threshold. For example the threshold may be set as 85% of the free flow speed or any other desired amount.

The method may extend to the step of obtaining the free flow speed for the or each navigable stretch or segment. The step of obtaining the free-flow speed for a stretch or segment may comprise analysing positional data relating to the movement of devices that traversed the navigable stretch or segment within a given predetermined time period. The relevant data may be obtained by suitable filtering of the positional data by reference to time. In order to be able to obtain a free flow speed, the predetermined time period should be chosen appropriately so that it will include data relating to movements which are representative of movements made under free-flow conditions. Typically the time period will be relatively long, such as a 24 hour period, or longer. For example, a week long period, or even a month or longer period might be considered, if free flow conditions do not occur every day, or week, etc. The step of obtaining the free-flow speed for a stretch or segment may comprise analysing positional data relating to the movement of devices that traversed the stretch or segment within a given predetermined time period, preferably wherein the free-flow time obtained by averaging the speed of different devices traversing the stretch or segment in the given time period.

In determining whether a stretch is potentially affected by roadworks, one or more additional tests may be performed to validate a determination of the potential existence of roadworks based upon the comparison of the average speed of travel in the given time period and the free flow speed. The method may additionally involve comparing the average speed to an absolute threshold. Such a threshold is not set by reference to the free flow speed. The method may comprise determining that the navigable stretch is potentially affected by roadworks only when the average speed is a below a threshold set by reference to the free flow speed and is additionally below the absolute threshold. Alternatively or additionally, the method may comprise making a determination as to the potential existence of roadworks only when the free flow speed for a stretch or segment exceeds a given threshold. The threshold may be the same threshold as the absolute threshold to which the average speed determined for a stretch or segment is compared in embodiments where such a step is performed.

In order to further reduce the possibility of false positives, other steps may be taken. For example, the positional data used to determine the average speed of travel along the stretch (or at least a portion of one or more segments) may be a subset of the available positional data, relating to devices associated with vehicles that would be expected to travel at a typical speed for the stretch, i.e. non slow moving vehicles. Thus, the positional data that is used may exclude positional data obtained from devices associated with trucks or other such heavy goods vehicles. This may be achieved by excluding positional data relating to movement of devices at speeds below a given threshold for a distance above a given threshold (which may be set as an absolute value or relative to the length of the stretch or segment).

The method may be carried out in relation to a plurality of navigable stretches of the network. The method may be used to automatically detect roadworks. A server may be arranged to perform the methods of the invention automatically in relation to received, e.g. live, positional data.

The method may further comprise the step of generating a message indicative of the partial closure of a navigable stretch, e.g. indicative of the presence of roadworks affecting a stretch, when such a determination has been made, and preferably validated.

In accordance with the invention in any of its aspects or embodiments, the information concerning the determination of a partial closure of a navigable stretch, e.g. due to the presence of roadworks, may be used in various manners. In some embodiments the method further comprises associating data indicative of the partial closure, e.g. existence of the (preferably validated) roadworks, with data indicative of the or each navigable stretch (or the corresponding navigable segment or segments). The data indicative of a navigable stretch may be indicative of the position of the stretch. This may be any suitable position reference, which enables the affected navigable stretch to be identified in a digital map. Suitable location referencing methods as known in the art may be used. The roadworks data may be in the form of an attribute associated with the or each stretch (or the corresponding segment or segments). The method may comprise using information indicative of the partial closure of a navigable stretch, e.g. due to the existence of roadworks, in calculating a route and/or in providing traffic information, e.g. to devices associated with vehicles. The method may comprise providing information indicative of the partial closure of a navigable stretch, e.g. due to the existence of roadworks, to a third party provider, e.g. a traffic information provider.

As will be appreciated, a navigable stretch or segment as referred to herein has a given direction of travel. The determined partial closure is therefore a closure typically affecting one direction of travel.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or stretches should not be interpreted to require any particular restriction on data storage locations. The phrase only requires that the features are identifiably related to a segment or stretch. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining the partial closure of a navigable stretch in a road network. Accurate determination of the existence of partial road closures, e.g. due to the presence of roadworks, is important in a navigation system, or simply as additional travel information to drivers. A partial road closure will have an impact on possible routes between an origin and a destination, potentially necessitating alternative routes around the partially closed stretch to be used. Whether or not a route is pre-calculated, it is important to users of a navigation system to be informed of partial road closures and roadworks so that they can take a different route if needed. The present invention provides a method for more reliably, and automatically, detecting partial road closures and roadworks. An embodiment of the invention will now be described in relation to FIG. 1. This embodiment of the invention may be used to detect the presence of roadworks affecting a stretch of road of the road network.

Figure 1:
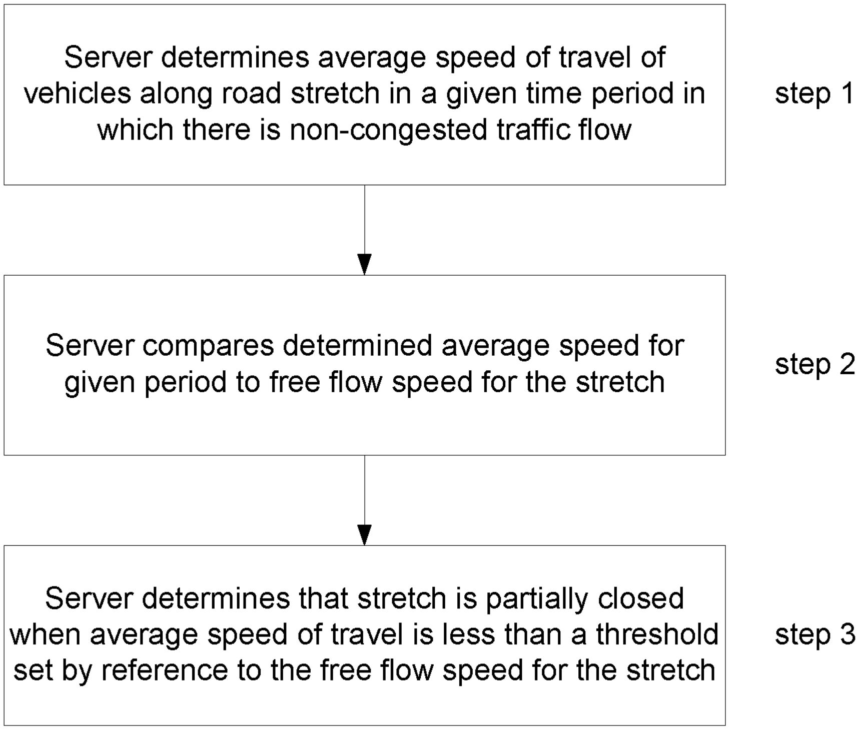
FIG. 1 is a flow chart illustrating the steps of a method for detecting the partial closure of a road stretch, e.g. due to the presence of roadworks, in accordance with an embodiment of the invention.

The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data. The positional data may be matched to road segments of a digital map representing the network of road elements.

In step 1, a server determines an average speed of travel of vehicles along a road stretch in a given time period during which there is non-congested traffic flow. Non-congested traffic flow can be assumed to exist when the traffic volume along the stretch is relatively low, e.g. below 50% of an average traffic volume for the stretch. The average speed of travel is determined using live vehicle probe data for the given time period. Thus, the average speed of travel can be considered to be a current speed of travel. The server disregards vehicle probe data relating to the movement of slow moving vehicles, i.e. trucks or other heavy goods vehicles. This is done be excluding probe data relating to vehicles that move at speeds usually associated with trucks over a significant distance. It has been found that an average speed useful for the purposes of the invention may be obtained based on positional data from as few as around 20 probe vehicles.

In step 2, the server compares the determined average speed for the given period to a free flow speed for the stretch. The free flow speed is indicative of the speed that vehicles are expected to travel along the element with when there is no or substantially little traffic. The free flow speed may be determined using digital map data that correspond to the stretch. For example, the free flow speed may be included as an attribute associated with the one or more segments representing the road element. (The stretch being represented by at least a portion of one or more segments of the digital map; the digital map comprising a plurality of connected segments that are representative of the road network.)

In step 3, the server determines that the stretch is potentially partially closed, e.g. affected by roadworks, when the average speed of travel along the stretch that has been obtained using the probe data for the given time period is less than a given threshold set by reference to the free flow speed. For example, where the free flow speed is 100 km/h or greater, a determination of the presence of roadworks may be made where the determined average speed of travel is at least 15 km/h less than the free flow speed. Other criteria may also be imposed before a determination as to the potential presence of roadworks can be made. For example, it may additionally be required that the average speed is below a threshold, e.g. 100 km/h. Another requirement might be that the free flow speed is above a given threshold, e.g. 100 km/h.

Once a stretch has been determined as potentially partially closed, e.g. affected by roadworks, the server may carry out a number of steps, such as one or more of: storing the data; generating a message indicative thereof; and transmitting the data to another server, or directly to navigation devices or ADAS systems associated with vehicles for use, for example, in route planning. The data may be provided as part as a traffic update transmission.

Figure 2:
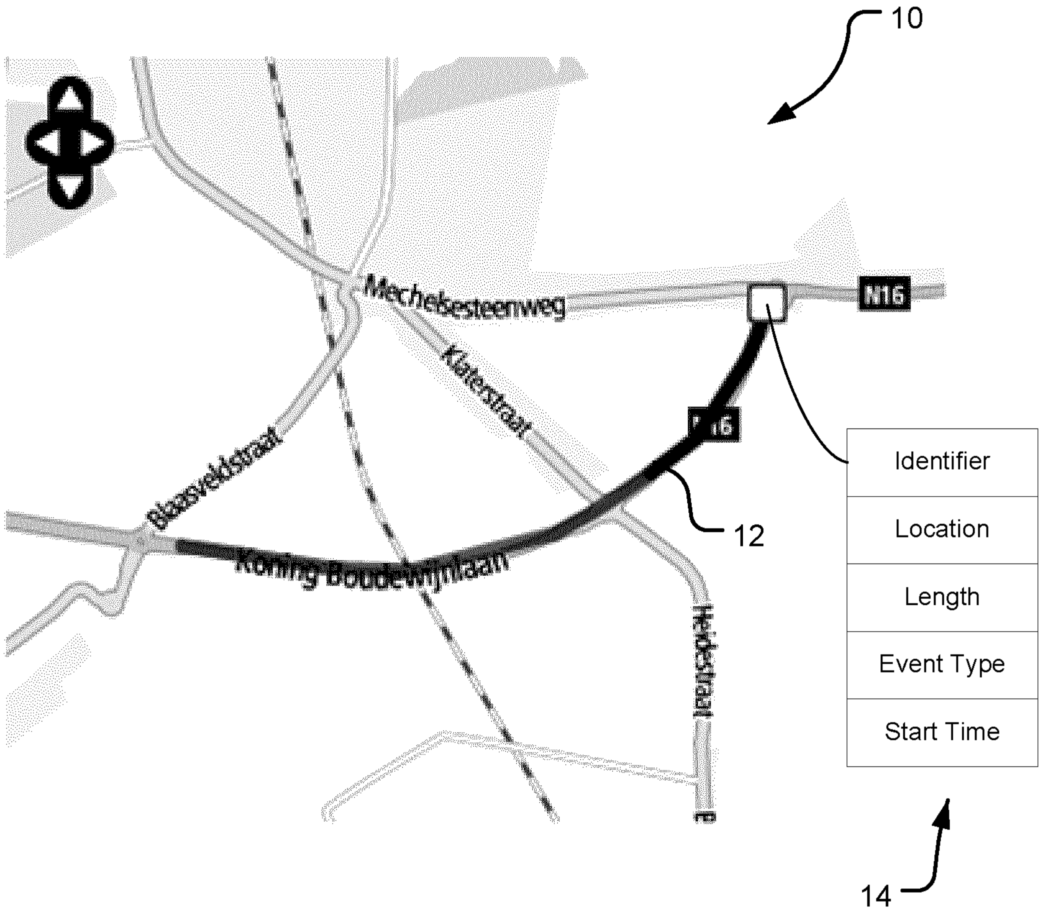
FIG. 2 shows a visual representation of a digital map with an indication of a determined partial road closure.

FIG. 2 shows a visualisation 10 of the road network geographic area, created using data from a digital map representative of the road network. Following the completion of the method depicted in FIG. 1 a road stretch 12 has been identified as being partially closed due to the presence of roadworks. A message 14 associated with the determined roadworks contains information such as one or more of: an internal identifier; a location (e.g. with respect to the digital map); a length of the road stretch determined to be affected by the road works; an event type identifier (in this case identifying that the stretch of road is affected by roadworks and is thus partially closed); and a start time (indicating when the stretch was first determined to be partially closed).

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of identifying navigable stretches that are potentially partially closed in a navigable network within a geographic area, the method comprising:
- obtaining, by a server that comprises a processor and a memory, positional data relating to the movement of a plurality of devices along a navigable stretch with respect to time in a given time period;
- determining that the given time period is a period of non-congested traffic flow for the navigable stretch;
- using, by the server, the positional data to determine an average speed of travel along the navigable stretch in the given time period;
- comparing, by the server, the average speed of travel to a free flow speed for the navigable stretch;
- comparing, by the server, the average speed of travel to a threshold value; and
- determining, by the server, that the navigable stretch is potentially partially closed when the given time is determined to be a period of non-congested traffic flow for the navigable stretch and when the average speed of travel is both lower than the free flow speed by a predetermined value and lower than the threshold value, wherein the threshold value is not set by reference to the free flow speed.

2. The method of claim 1, wherein the obtained positional data comprises live positional data, and the method comprises using the live positional data to determine the average speed of travel along the navigable stretch in the given time period.

3. The method of claim 1, wherein the devices are devices associated with vehicles.

4. The method of claim 1, wherein the time period is a period in which the traffic volume for the navigable stretch is less than 50% of the average traffic volume for the stretch.

5. The method of claim 1, wherein the given time period is a time period including a current time.

6. The method of claim 1, wherein the navigable stretch is potentially partially closed when one or more of multiple lanes of the navigable stretch are closed to traffic flow, but one or more lanes remain available for traffic flow.

7. The method of claim 1, wherein determining that the navigable stretch is potentially partially closed further comprises determining that the navigable stretch is potentially partially closed when the free flow speed exceeds a threshold value.

8. The method of claim 1, further comprising excluding positional data relating to the movement of devices having speeds determined to be below a given threshold for a distance above a given threshold.

9. The method of claim 1, wherein determining that the given time period is a period of non-congested traffic flow for the navigable stretch comprises determining that the given time period is a period having a traffic flow substantially lower than an average traffic volume for the navigable stretch.

10. The method of claim 1, further comprising:

determining a type of vehicle associated with the positional data; and removing, from positional data used to determine the average speed, positional data from specified types of vehicles, the specified types of vehicles being vehicles that are expected to travel at speeds that are lower than typical speeds for other types of vehicles.

11. A non-transitory computer readable medium comprising computer readable instructions which, when executed by at least one processor of a system, cause the system to perform a method comprising:

obtaining positional data relating to the movement of a plurality of devices along a navigable stretch with respect to time in a given time period;

determining that the given time period is a period of non-congested traffic flow for the navigable stretch;

using the positional data to determine an average speed of travel along the navigable stretch in the given time period;

comparing the average speed of travel to a free flow speed for the navigable stretch;

comparing the average speed of travel to a threshold value; and determining that the navigable stretch is potentially partially closed when the given time is determined to be a period of non-congested traffic flow for the navigable stretch and when the average speed of travel is both lower than the free flow speed by a predetermined value and lower than the threshold value, wherein the threshold value is not set by reference to the free flow speed.

12. The non-transitory computer readable medium of claim 11, wherein the obtained positional data comprises live positional data, and the method comprises using the live positional data to determine the average speed of travel along the navigable stretch in the given time period.

13. The non-transitory computer readable medium of claim 11, wherein the devices are devices associated with vehicles.

14. The non-transitory computer readable medium of claim 11, wherein the time period is a period in which the traffic volume for the navigable stretch is less than 50% of the average traffic volume for the stretch.

15. The non-transitory computer readable medium of claim 11, wherein the given time period is a time period including a current time.

16. A system for identifying navigable stretches that are potentially partially closed in a navigable network within a geographic area, the system comprising:

at least one processor, the at least one processor configured to:

obtain positional data relating to the movement of a plurality of devices along a navigable stretch with respect to time in a given time period;

determining that the given time period is a period of non-congested traffic flow for the navigable stretch;

use the positional data to determine an average speed of travel along the navigable stretch in the given time period;

compare the average speed of travel to a free flow speed for the navigable stretch;

compare the average speed of travel to a threshold value; and determine that the navigable stretch is potentially partially closed when the given time is determined to be a period of non-congested traffic flow for the navigable stretch and when the average speed of travel is both lower than the free flow speed by a predetermined value and lower than the threshold value, wherein the threshold value is not set by reference to the free flow speed.

17. The system of claim 16, wherein the obtained positional data comprises live positional data, and the at least one processor is further configured to use the live positional data to determine the average speed of travel along the navigable stretch in the given time period.

18. The system of claim 16, wherein the devices are devices associated with vehicles.

19. The system of claim 16, wherein the time period is a period in which the traffic volume for the navigable stretch is less than 50% of the average traffic volume for the stretch.

20. The system of claim 16, wherein the given time period is a time period including a current time.

* * * * *